United States Patent [19]

Francis

[11] 3,956,824
[45] May 18, 1976

[54] CORDLESS ELECTRIC GRASS SHEAR HAVING IMPROVED BLADE SYSTEM

[75] Inventor: Charles Francis, Manchester, Md.

[73] Assignee: The Black and Decker Manufacturing Company, Towson, Md.

[22] Filed: Oct. 1, 1974

[21] Appl. No.: 511,053

[52] U.S. Cl. ................................ 30/220; 30/221; 30/DIG. 1
[51] Int. Cl.² ........................................ B26B 19/02
[58] Field of Search ............ 30/216, 220, 221, 222, 30/248, DIG. 1, 210

[56] References Cited
UNITED STATES PATENTS

| 248,952 | 11/1881 | Ridgway | 30/221 |
|---|---|---|---|
| 1,762,401 | 6/1930 | McCloskey | 30/205 |
| 2,736,961 | 3/1956 | Howell | 30/248 X |
| 3,623,223 | 11/1971 | Edgell | 30/220 |

Primary Examiner—Al Lawrence Smith
Assistant Examiner—J. C. Peters
Attorney, Agent, or Firm—Edward D. Murphy; Leonard Bloom; William Kovensky

[57] ABSTRACT

A battery powered grass shear having improved upper and lower shear blades with improved cutting and durability characteristics and which require less power to operate. The lower shear blade, which is fixed to the housing of the battery powered grass shear, is provided with a forwardly and upwardly extending forward portion provided with transversely spaced apart cutting teeth. The upper shear blade, which is reciprocated relative to the lower shear blade, is formed of a comparatively thin, heat treatable, resilient steel and is normally flat when in a non-stressed state. The upper blade, when assembled to the lower blade is bowed upwardly and the cutting edges of the spaced apart teeth on the upper blade intersect the cutting edges of the spaced apart teeth on the lower blade and make point to point contact throughout the length of the blade as the blades are reciprocated. The cutting surfaces are preferably heat treated to an equal hardness.

10 Claims, 13 Drawing Figures

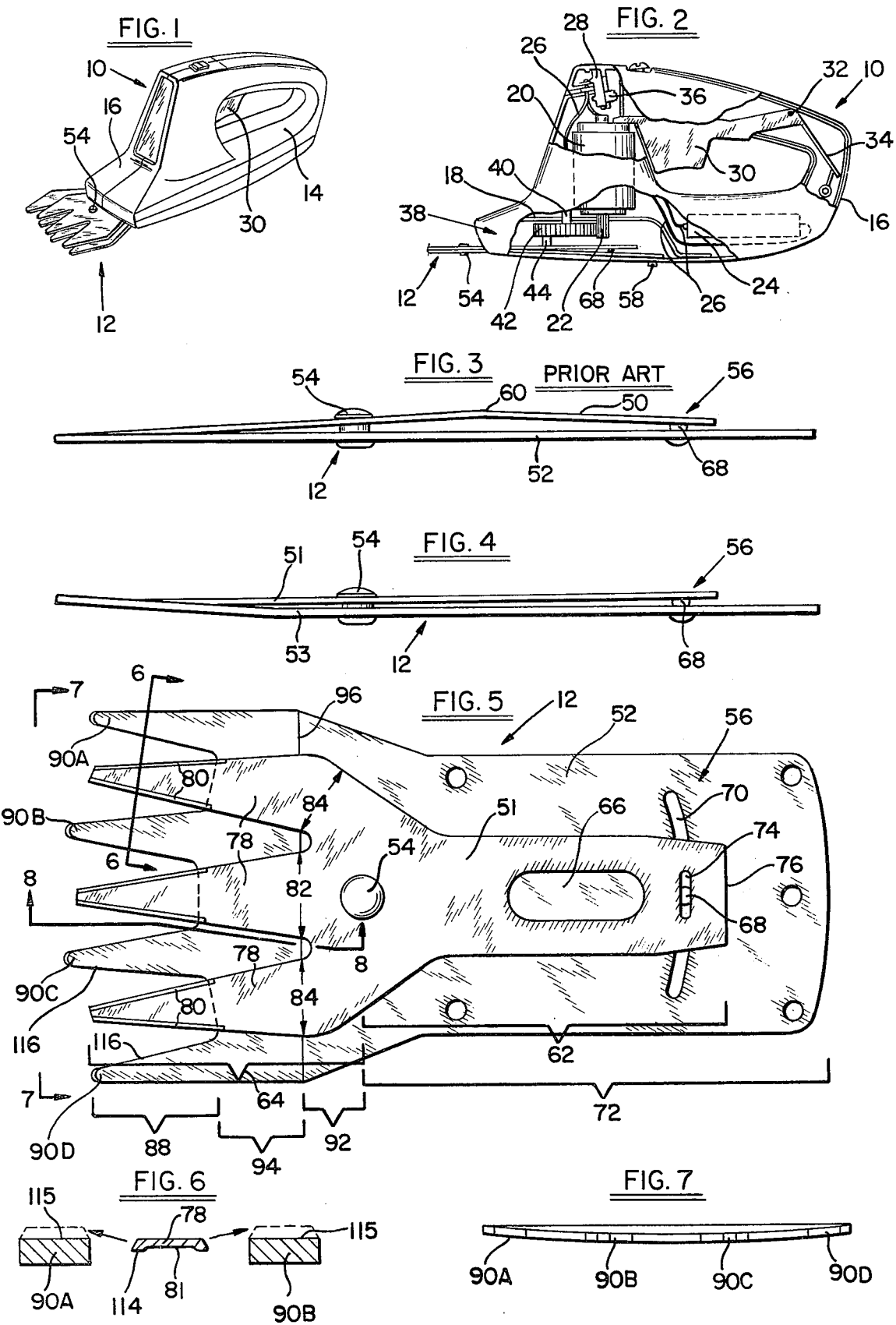

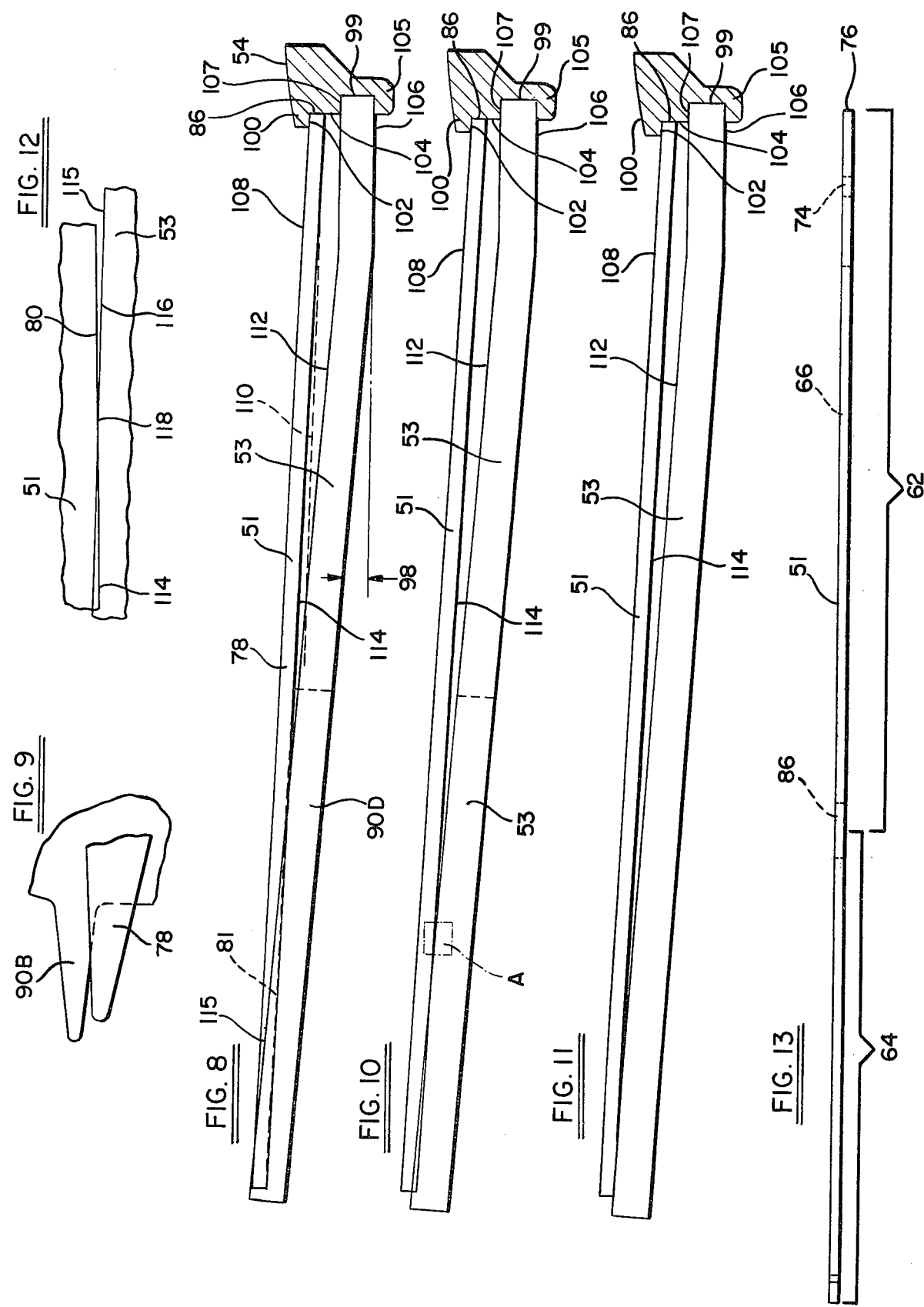

CORDLESS ELECTRIC GRASS SHEAR HAVING IMPROVED BLADE SYSTEM

FIELD OF THE INVENTION

This invention relates generally to battery powered portable hand tools, and more particularly to a battery powered grass shear having improved cutting and durability characteristics and lower current drain than prior art constructions.

DESCRIPTION OF THE PRIOR ART

Cordless or battery powered grass shears are well-known in the prior art and one example can be seen in U.S. Pat. No. 3,623,223. These devices generally include a battery, a motor, interconnected drive means, all of which are mounted within a housing, and upper and lower shear blades, the lower shear blade generally being secured to the housing and the upper shear blade generally being pivotally secured to the lower shear blade and reciprocated by means of the drive means. The shear blades of the prior art patent, as well as the prior art shear blades shown in FIG. 3 of this application, have been traditionally formed with a substantially flat, comparatively thick, lower shear blade and a reciprocal upper shear blade of relatively thin resilient steel. The upper blade has been either bowed or kinked to cause the transversely spaced apart cutting teeth of the upper shear blade to extend forwardly and downwardly to cause the cutting edges of the upper and lower teeth to intersect with each other as the upper blade is reciprocated relative to the lower blade. To give the best possible cutting action, the intersecting cutting teeth should mate with each other in point to point contact.

It has been found in the manufacture of the foregoing blade construction that a relatively large percentage of the asembled blades fail to pass initial quality standards. Furthermore, those that pass the initial quality standards have a comparatively short service life, poor wear characteristics, and higher battery drain (particularly towards the end of the service life) than the shear blade construction of this invention. This is due principally to the fact that the lower blade is flat and the upper blade is either kinked or curved, and also due to the metallurgical requirements of the various blades.

The upper blade has a combined function of driving the cutting teeth, acting as a cutter, and also acting as a spring. Therefore in order to insure these combined functions it is desirable that the upper blade be of relatively thin, heat hardenable, resilient steel. While it is possible to heat treat only the cutting teeth of the lower blade by an induction heating process or the like, the entire upper blade is generally heat treated to provide for the desired wear resistance in the area of the pivot, the bearing, and also in the area of the elongated aperture which is engaged by an eccentric which is employed to reciprocate the upper blade relative to the lower blade. As it is not desirable to heat treat the upper blade after it has been kinked or bowed to its desired final shape (due to the distortion imparted to the previously kinked metal by the heat treating process), it is necessary that the upper blade be kinked or bowed in the prior art design after heat treatment. If the upper blade is heat treated too much, there is danger of breakage during the subsequent bending operation of the blade. Therefore, it has not been practical in the prior art constructions to harden the cutting edges of the cutting teeth of the upper blades to the desired hardness. As a suitable degree of hardness cannot be designed into the cutting edges of the prior art upper cutting teeth they tend to wear relatively rapidly, particularly if high down pressure is maintained by the spring effect of the upper blade. The wear causes the blades along their cutting edges to form surface contact rather than point to point contact. This additional contact area will increase battery drain due to increased friction. This will also cause lifting of the forward ends of the cutting teeth of the upper blade which will in turn cause the blades to fail to operate in their intended manner as the grass will now be pinched rather than cut.

Furthermore, it should be observed that when the bend or bow is imparted to the upper shear blade, the shear blade will spring back after the initial bend or bow is imparted, and the degree of spring back will vary from lot to lot of stock material. This causes high tolerance variations in the final assembled unit and a relatively high rejection rate. For example, if there is excessive spring-back, the blades may not cut adequately.

Another disadvantage of this construction is that due to the poor wear characteristics of the relatively soft upper blade, a lower down pressure is utilized to minimize adverse wear characteristics. However, lower down pressure will permit the tip end of the blades to separate more readily to cause trapping or pinching of the grass between the opposed surfaces of the blade.

It has also been found with particular reference to the prior art design shown in FIG. 3 that the proper angle of attack between the upper and lower blades cannot satisfactorily be achieved. This is due to the fact that the bend or kink in the upper blade cannot be placed in its most desirable location, which is between the pivot and the intersecting cutting surfaces of the cutting teeth. If the kink were placed in this location there would be an inherent danger of fracturing of the upper teeth along the bend line. Therefore, the kink in the prior art design shown in FIG. 3 must be placed along the trailing portion of the upper shear blade and this causes the attack angle to be undesirably shallow and the tool may not cut properly.

OBJECTS AND SUMMARY OF THE INVENTION

It is an object of the present invention to provide a novel design of upper and lower shear blades for a battery powered grass shear which can be consistently manufactured and assembled to specifications, which will cut better, have better wear characteristics, and lower battery drain than prior art constructions.

More specifically, it is an object of the present invention to provide a shear blade assembly for a battery powered grass shear wherein point to point contact is maintained between the cutting surfaces of the transversely spaced apart cutting teeth of the upper and lower shear blade as the upper shear blade is reciprocated relative to the lower shear blade and also wherein higher unit pressures can be maintained particularly in the outer teeth to improve the cutting characteristics of the upper and lower shear blades, their durability, and furthermore, to lower the drain on the battery.

These and other objects and advantages are achieved by providing upper and lower shear blades having a plurality of transversely spaced apart forwardly extending cutting teeth whose cutting edges are hardened the same amount and preferably to at least 56 on the Rockwell "C" Scale, the lower shear blade being provided with an upwardly and forwardly extending portion in which the cutting teeth of the lower shear blade are formed, the upper shear blade being generally flat when in a free non-stressed state and formed of comparatively thin, heat hardenable, resilient steel, the blades being assembled in such a manner that the forward cutting teeth of the upper blade are deflected upwardly a limited amount when the rearward ends of the intersecting cutting surfaces of the upper and lower cutting teeth engage each other, there being point to point contact between the intersecting cutting surfaces of the cutting teeth throughout their length as the upper blade is reciprocated relative to the lower blade, the upper blade being deflected upwardly a greater amount as the forward end of the intersecting cutting surfaces intersect each other, and the outer teeth of the lower blade being disposed slightly above the intermediate teeth whereby satisfactory down pressure between the cutting surfaces throughout the length of all the teeth is maintained during the reciprocation of the upper blade. By making the upper blade flat it can be hardened the desired amount.

The foregoing objects and other objects, features, and advantages of this invention will be apparent to those skilled in the art after a consideration of the following detailed description taken in conjunction with the accompanying drawings.

BRIEF DESCRIPTION OF THE DRAWINGS

FIG. 1 is a perspective view of a battery powered hand carried portable grass shear in which the principles of the present invention are incorporated.

FIG. 2 is a section taken through the grass shear shown in FIG. 1, parts being eliminated and simplified for purposes of illustration.

FIG. 3 is a side view of a prior art shear assembly.

FIG. 4 is a side view of the grass shear assembly of the present invention.

FIG. 5 is a plan view of the grass shear assembly of the present invention.

FIG. 6 is a section taken along the lines 6—6 of FIG. 5.

FIG. 7 is an end view of the lower shear blade taken along the lines 7—7 in FIG. 5.

FIG. 8 is an enlarged side view of the forward end of the grass shear assembly shown in FIG. 5.

FIG. 9 is a plan view of a portion of the assembly showing the blades in a somewhat different disposition than in FIG. 5.

FIG. 10 is a side view comparable to FIG. 8 showing the blades when they are in the position shown in FIG. 9.

FIG. 11 is a side view comparable to FIG. 8 when the tips of the cutting teeth of the upper and lower blades are in engagement with each other.

FIG. 12 is a greatly enlarged fragmentary view showing the manner in which the upper and lower cutting surfaces of the cutting teeth of the upper and lower blades intersect each other.

FIG. 13 is a side view of the upper shear blade when it is unassembled.

DETAILED DESCRIPTION OF THE PREFERRED EMBODIMENT

Referring first to FIGS. 1 and 2 in which a battery powered grass shear is illustrated, the grass shear including a housing indicated generally at 10 and a grass shear blade assembly indicated generally at 12. The housing includes a pair of mating clam-shell housing halves 14 and 16 and a mounting frame member 18 of a somewhat inverted U-shaped construction, the mounting fram member being secured to the mating clam-shell housing halves in a manner not material to the present invention. Motor means 20 are mounted upon the mounting frame member 18, the motor means 20 having output means 22 in the form of a splined shaft 22 which extends below the mounting frame member 18. Battery means 24 are carried within the housing 10, the battery means being selectively interconnected with the motor means by leads 26 and a switch 28. A trigger 30 is pivotally secured to the housing at 32 and is normally spring biased to a lower position by a spring extension 34. When the trigger is moved upwardly against the spring it will contact operating button 36 of the switch 28 to cause the motor means to be selectively interconnected with the battery means 24.

Drive means, indicated generally at 38, are carried by the mounting frame member 18, the drive means including a shaft 40 carried by said mounting frame member 18, a gear 42 journalled about the shaft 40, the gear 42 meshing with the splined shaft 22, and an eccentric 44 carried by the lower side of the gear 42. Other suitable gear means may be substituted.

The grass shear blade assembly 12 of the prior art construction shown in FIG. 3 includes an upper movable shear blade 50, a lower shear blade 52, pivot means 54, and bearing means indicated generally at 56. The lower shear blade 52 is fixidly secured to said housing, and to this end fastener means 58 are provided, the fastener means passing through suitable apertures in the lower shear blade and being screwed into the mounting frame member 18 to rigidly secure the lower shear blade to the housing The prior art construction shown in FIG. 3 has a flat lower shear blade and a kinked upper movable shear blade which was bent at 60 to cause the forward transversely spaced apart cutting teeth of the upper shear blade to contact the forward transversely spaced apart cutting teeth of the lower shear blade. As previously noted, the prior art construction was not satisfactory for a variety of reasons.

The upper movable shear blade of this invention shown in FIG. 4, is formed of a hard, relatively thin, heat hardenable resilient spring steel, the upper movable shear blade 51 of this invention being substantially flat when in an unassembled or un-stressed condition as can be seen from FIG. 13. The upper movable shear blade includes a trailing portion indicated by the bracket 62, and a leading portion indicated by the bracket 64 in FIG. 5. The trailing portion 62 is adapted to be interconnected with the drive means 38, and to this end, the trailing portion is provided with a longitudinally elongated aperture 66 which receives the eccentric 44. When the motor means 20 is selectively interconnected with the battery means 24, the drive means will be rotated causing the upper movable shear blade 51 to be reciprocated relative to the fixed lower shear blade 53 about the pivot means 54. The bearing means 56 includes a bearing ball 68 which rides between an arcuate groove 70 (FIG. 5) formed in the trailing portion 72 of the lower shear blade 52 and an arcuate cut-out 74 formed in the trailing portion 62 of the upper shear blade, the arcuate cut-out 74 being disposed between the longitudinally extending elongated aperture 66 and the rear end 76 of the upper shear blade. The leading portion of the upper shear blade is provided with a plurality of transverse spaced apart cutting teeth 78, the surface lying between the lateral cutting edges 80 of the teeth 78 being coined upwardly a slight amount as indicated at 81 in FIG. 8 to reduce the likelihood of surface to surface contact between opposed faces of the upper and lower shear blades during reciprocation of the upper shear blade relative to the lower shear blade. The root width indicated by the dimension 82 of the intermediate tooth of the upper shear blade is in excess of the root width indicated by the dimension 84 of the outer cutting teeth. This will allow the outer teeth of the upper shear blade to be deflected upwardly more readily than the inner tooth. The upper shear blade is also provided with an aperture 86 (FIG. 13) which is adapted to receive the pivot means 54, the aperture being disposed between trailing and leading portions, and midway between the sides.

The lower shear blade 53 of this invention is formed of a comparatively thick hardenable steel and includes, in addition to the trailing portion 72, a leading portion, the forward portion 88 of the leading portion being provided with a plurality of transversely spaced apart forwardly extending V-shaped cutting teeth 90A, 90B, 90C, and 90D. The leading portion also includes a first intermediate portion 92, and a second intermediate portion 94, which is almost twice as long as the first portion 92. The lower shear blade is bent or kinked along a transversely extending bend line indicated at 96. In this regard, it should be noted that the trailing portion 72 and the first intermediate portion 92 lie in a common plane and the second intermediate portion 94 and the cutting fingers 90 lie in a second common plane which is disposed at an angle to the extension of the plane of the trailing portion and first intermediate portion of 2 to 5 degrees, the angle being represented at 98 in FIG. 8. An aperture 99 is provided in the lower shear blade between the trailing portion 72 and the first intermediate portion 92 and midway between the sides thereof, the aperture being adapted to receive the pivot means 54.

The pivot means 54 employed in this invention is preferably a shouldered rivet having a head 100, the lower surface 102 of the head of the rivet 100 serving as an abutment means which limits the upward movement of the upper shear blade, the rivet also including a shoulder portion 104, and a deformable portion 105 which extends through the aperture in the lower shear blade, the deformable portion being deformed about the lower surface 106 adjacent the aperture to rigidly secure the pivot means or rivet in its place, said deformable portion cooperating with the radial surface 107 below the shoulder portion to hold the rivet from vertical movement relative to the lower shear blade.

When the parts are in their assembled relationship shown in full in FIG. 4 and in somewhat different dispositions of the parts shown in part in FIGS. 10 and 11, the upper shear blade will be resiliently stressed or bowed out of its normal flat condition causing the cutting edges of the teeth of the upper shear blade to be spring biased downwardly upon the cutting edges of the cutting teeth of the lower shear blade in point to point contact. When in this assembled relationship the upper surface 108 of the upper blade will be biased against the lower surface 102 of the head of the rivet 100 and similarly, the trailing portion 62 will be biased downwardly against the bearing ball 68. The height of the shoulder 104 of the rivet 54, the diameter of the ball 68, the depth of the groove 70, and the width of the arcuate slot 74 are so selected as to dispose the trailing portion at a very slight downwardly and forwardly inclined position. The plane 110 defined by the lower trailing surfaces of the upper blade when in contact with the bearing means and upper abutment means 102 of the pivot means intersects the upper surface 112 of the second intermediate portion as can be seen from FIG. 8. Therefore, as the lower surface of the upper shear cannot lie below the forward end of the second intermediate portion it will be bowed or stressed upwardly as can best be seen in FIGS. 4 and 8. When the parts are in the position shown in FIG. 5 the lower surface 114 of a forward portion of the upper teeth 78 will lie below an upper surface 115 of the lower teeth as can be seen from FIG. 6. As the upper cutting shear is reciprocated from the position shown in FIG. 5 to the position shown in FIG. 9 and then finally to a position where the tip of the upper blade is in contact with the tip of point to point lower blade, this position being shown in side view in FIG. 11, the cutting edges 80 of the upper shear blade will progressively contact the cutting edges 116 of the cutting teeth of the lower shear in point to point contact, and as this movement occurs the upper shear blade will be further stressed upwardly as can be seen from a comparison of FIGS. 8, 10, and 11 until it reaches its ultimate height in FIG. 11. The upward movement of the forward ends of the teeth will cause the teeth where they intersect with the lower teeth in point contact to have sufficient point contact pressure to prevent inadvertent separation of the teeth during normal operation thereof.

With reference to FIG. 7 it can be seen that the outer cutting teeth 90A, 90D, are spaced slightly above the intermediate cutting teeth 90B, 90C. This is done to insure more uniform pressure between the cutting surface 80 and 116 of all the teeth as, as previously noted, the outer teeth 78 of the upper shear member can be more easily deflected upwardly due to the smaller root width 84 of the outer teeth compared to the root width of the inner tooth 82. Alternatively, a similar cutting action could be achieved by equalizing the root widths of the upper blade and providing a lower blade which is flat across its width. However, the construction as illustrated enables easier control of manufacturing tolerances. The overall pressure can be readily varied by merely increasing or decreasing the diameter of the bearing ball 68, but in general it has been found that when the parts are disposed in the relationship shown in these drawings that satisfactory shearing of grass is accomplished.

By kinking or bending the lower shear blade between the first and second intermediate sections 92, 94, respectively, rather than bending the upper shear blade in the manner indicated in the prior art at FIG. 3, an improved construction is achieved. Thus, it is now possible to harden the upper and lower cutting teeth to the same degree of hardness and in practice, both sets of teeth are hardened to a hardness of at least 56 on the Rockwell C Scale. It has been found that a hardness in the Rockwell C Scale from 56 to 60 will provide satisfactory wear characteristics and will also satisfactorily cut grass. Also, by bending the shear blade forwardly of the pivot in the location indicated, a satisfactory attack angle can be achieved between the normally flat upper and lower cutting teeth if the lower blade is bent within a range of 2° to 5°. The particular construction of this invention also maintains point to point contact between the upper and lower cutting teeth, this point to point contact being indicated at 118 in FIG. 12 which is a highly enlarged view of the intersection of the parts shown at A in FIG. 10.

In summary, it should be noted that the pivot means and the bearing means cooperate with the kinked lower shear blade and the upper shear blade, which is normally flat when in an un-stressed or unassembled condition, to maintain point to point contact between the intersecting cutting edges 80 and 116 of the upper and lower cutting teeth of the shear blades during reciprocation of the upper movable shear blade, the raised outer teeth of the lower shear blade along with the geometry of the bearing, pivot, and angle 98 insuring sufficient point contact pressure between the intersecting cutting edges of all the cutting teeth of the upper and lower shear blades to insure against inadvertent separation of the upper and lower cutting teeth during normal operation thereof. If proper pressure were not maintained the upper blades could be deflected away from the lower blades to pinch grass and thus the shear blades would no longer be performing in their intended manner. Stated another way, the angle of inclination of the cutting teeth 90 and second intermediate portion 94 of the lower blade with respect to the trailing portion is so selected, along with the spacing between the upper and lower shear blades permitted by the pivot means and the bearing means, to insure during reciprocation of the upper blade with respect to the lower blade that the angle between the forward portions of the upper and lower shear blades is sufficient to maintain point to point contact between the intersecting cutting edges of the upper and lower teeth, that the upper blade is sufficiently spring loaded to maintain sufficient point contact pressure between the cutting teeth so that they will not inadvertently separate during normal operation thereof, and that the facing surfaces of the blades will not contact each other except along the point contact area between the cutting edges of the cutting teeth. It should also be observed that the novel construction shown in this application can be made to meet specifications more readily than the prior art, and also, that tolerance variations are minimized and that the assembled cutting shears will perform in a more satisfactory manner than the prior art. Furthermore, there is less loading on the battery during operation of the novel shears of this invention because there is a reduction of area in contact. Thus, in prior art design, such as that shown in FIG. 3, the portion of the teeth immediately behind the intersection of the teeth tends to remain in contact because point to point contact is not insured, while in the new design shown in FIG. 4 and the subsequent Figures, the portion immediately behind the intersection of the teeth does not remain in contact and therefore there is a reduction in frictional surface contact areas between the teeth.

A further advantage lies in the fact that the kink can now be positioned forwardly of the pivot means 54. This enables relatively flat, uniform contact to be maintained between the rivet head 100, and the upper blade 51. In contrast, the prior art caused an angular relationship which can produce uneven wear and poorer control of the cutting process.

While the preferred structure in which principles of the present invention have been incorporated is shown and described above, it is to be understood that this invention is not to be limited to the particular details, shown and described above, but that, in fact, widely differing means may be employed in the practice of the broader aspects of the invention.

For example, the structure of the present invention is entirely appropriate for inclusion in the modular cordless tool structure described and claimed in the copending application of Peter Russell Owings, et al., Ser. No. 500,131, filed Aug. 23, 1974 and assigned to the assignee of this invention, since the housing illustrated in FIG. 1 may alternatively be constructed in accordance with the modular design described in that application. Accordingly, it is intended that the appended claims cover all such changes and modifications as fall within the true spirit and scope of this invention.

What is claimed is:

1. A battery powered grass shear having improved cutting and durability characteristics and lower battery drain comprising:

a housing;

battery means carried by said housing;

motor means mounted within said housing and selectively interconnectable with said battery means;

drive means disposed within said housing and operatively interconnected with said motor means;

an upper movable shear blade of hard, relatively thin, heat treatable, resilient steel and including a trailing portion interconnected with said drive means and adapted to be reciprocated thereby and a leading portion having a plurality of transversely spaced apart forwardly extending cutting teeth, the lower surface of the trailing and leading portions substantially lying in a common plane when said upper blade is in a free, non-stressed state, said upper blade being adapted to be resiliently flexed out of said plane;

a lower shear blade fixidly secured to said housing, said lower shear blade being of a comparatively thick, heat treatable steel and including a trailing portion and a leading portion, the forward portion of said leading portion being provided with a plurality of transversely spaced apart forwardly extending cutting teeth;

pivot means adapted to interconnect said upper and lower shear blades between their trailing and leading portions, said pivot means permitting the blades at the point of pivotal interconnection to be spaced away from each other a limited amount; and bearing means disposed between the trailing portion of the upper movable shear blade and the trailing portion of the lower shear blade, said bearing means maintaining the trailing portions of the upper and lower blades in spaced apart relationship with respect to each other;

a forward portion of the leading portion of said lower blade further being inclined upwardly toward said upper blade forward of a transversely extending bend line between the pivot means and the rearward end of the forwardly extending cutting teeth, the angle of inclination of the forward portion of the leading portion of the lower blade being so selected, along with the spacing between the upper and lower shear blades permitted by said pivot means, and the spacing between the trailing portions of the upper and lower shear blades permitted by said bearing means to insure during reciprocation of the upper blade with respect to the lower blade that the angle between the forward portions of the upper and lower shear blades is sufficient to maintain point to point contact between the intersecting cutting edges of the upper and lower cutting teeth, that the upper blade is sufficiently spring loaded to maintain sufficient point contact pressure between the cutting teeth of the upper and lower blades whereby the cutting teeth will not inadvertently separate during normal operation thereof, and that the facing surfaces of said blades will not contact each other except along the point contact area between the cutting edges of the cutting teeth.

2. The battery powered grass shear set forth in claim 1 in which the outer cutting teeth of said lower blade are spaced slightly above the intermediate cutting teeth to further insure maintenance of proper contact pressure between the intersecting cutting edges of the outer cutting teeth of the upper and lower blades.

3. The battery powered grass shear set forth in claim 1 wherein the upper and lower cutting teeth are each heat treated to substantially the same hardness.

4. The battery powered grass shear set forth in claim 1 wherein both said upper and lower cutting teeth are heat treated to a minimum hardness of 56 on the Rockwell C Scale.

5. A battery powered grass shear having improved cutting and durability characteristics and lower battery drain comprising:
  a housing;
  battery means carried by said housing;
  motor means mounted within said housing and selectively interconnectable with said battery means whereby said motor means may be selectively operated, said motor means including output means;
  drive means mounted within said housing and interconnected with the output means of said motor means;
  a lower shear blade of comparatively thick hardenable steel, said lower shear blade having a generally horizontal trailing portion, a first intermediate portion, aperture means disposed between the first intermediate portion and the trailing portion and lying substantially midway between the sides of the first intermediate and trailing portions, said first intermediate portion and said trailing portion substantially lying in a common plane, an upwardly and forwardly extending second intermediate portion, and a plurality of transversely spaced apart V-shaped upwardly and forwardly extending cutting teeth interconnected with said second intermediate portion, said V-shaped cutting teeth and said second intermediate portion substantially lying in a common plane disposed at an angle to the plane of the trailing portion and the first intermediate portion;
  means rigidly securing the trailing portion of said lower shear blade to said housing;
  an upper movable shear blade of hard, relatively thin, heat hardenable resilient steel, said upper shear blade having a trailing portion, a forward portion provided with a plurality of transversely spaced apart V-shaped forwardly extending cutting teeth, aperture means lying between the forward and trailing portions and midway between the sides of the trailing and forward portions, said trailing and forward portions lying in substantially the same plane when in a free, non-stressed state, said trailing portion of said upper movable shear blade being interconnected with said drive means in such a manner that when said motor means is selectively interconnected with said battery means said trailing portion will be reciprocated from side to side relative to the trailing portion of said lower shear blade;
  bearing means disposed between the trailing portions of said upper and lower shear blades and adapted to maintain the facing surfaces of the trailing portions in spaced apart relationship with respect to each other; and
  pivot means extending between the said apertures in said upper and lower shear blades, said pivot means having upper abutment means adapted to contact the upper surface of said upper shear blade to keep said upper blade from moving away from the lower shear blade beyond a prescribed amount, the plane defined by the lower trailing surface of the upper blade when in contact with the bearing means and the upper abutment mans of said pivot means intersecting the upper surface of the second intermediate portion of said lower shear blade;
  the parts being so arranged and constructed that when in their assembled relationship the cutting edges of the cutting teeth of the upper blade will be spring loaded into point to point contact against the cutting edges of cutting teeth of the lower blade due to the upper blade being resiliently stressed out of its free state, the teeth of the upper and lower blades maintaining only point to point contact with each other along their intersecting cutting edges during reciprocation of upper shear blade.

6. The battery powered grass shear set forth in claim 5 wherein said upper blade is provided with intermediate and outer spaced apart cutting teeth, the root width of the outer cutting teeth being less than the root width of the intermediate cutting teeth, and further characterized by the provision of the outer cutting teeth of said lower shear blade being slightly raised above the intermediate cutting teeth of the lower shear blade whereby substantially equal pressure is maintained along point to point contact of all of the intersecting cutting edges of the upper and lower shear blades.

7. The battery powered grass shear set forth in claim 5 wherein the second intermediate portion and the forwardly extending transversely spaced apart cutting fingers of the lower shear blade are disposed at an angle in the range of 2° to 5° relative to the extended plane of the first intermediate portion and the trailing portion of said lower shear blade.

8. The battery powered grass shear set forth in claim 7 wherein the second intermediate section of the lower shear blade has a length almost twice as long as the length of said first intermediate section of the lower shear blade.

9. The battery powered grass shear set forth in claim 5 wherein the cutting teeth of both of said blades are hardened to a hardness of at least 56 on the Rockwell C Scale.

10. A battery powered grass shear having improved cutting and durability characteristics and lower battery drain comprising:
  a housing:
  battery means carried by said housing;
  motor means mounted within said housing and selectively interconnectable with battery means whereby said motor means may be selectively operated, said motor means including output means;

drive means mounted within said housing and interconnected with the output means of said motor means;

a kinked lower shear blade of comparatively thick steel, said lower blade having a trailing portion securable to said housing, a first intermediate portion, aperture means disposed between the first intermediate portion and the trailing portion and lying substantially midway between the sides of the intermediate and trailing portions, said first intermediate portion and said trailing portion lying in substantially a common plane, a second upwardly and forwardly extending intermediate portion, and a plurality of spaced apart V-shaped forwardly extending cutting teeth interconnected with second intermediate portion, said V-shaped teeth having cutting edges hardened to at least 56 on the Rockwell C Scale, and said V-shaped cutting teeth and said second intermediate portion lying in substantially a common plane disposed at an angle of 2° to 5° relative to an extension of the plane of the trailing portion and the first intermediate portion;

means rigidly securing the trailing portion of said lower shear blade to said housing:

an upper shear blade of hard, relatively thin, resilient steel, said upper shear blade having a trailing portion, a forward portion provided with a plurality of transversely disposed V-shaped cutting teeth, said V-shaped teeth having cutting edges of substantially the same hardness as the cutting edges of the cutting teeth of the lower shear blade, aperture means lying between the forward and trailing portions and midway between the sides of the forward and trailing portions, said trailing and forward portions lying substantially the same plane when the upper shear blade is in a free, non-stressed state, and said trailing portions of said upper shear blade being interconnected with said drive means in such a manner that when said motor means is selectively interconnected with said battery means said trailing portion will be reciprocated from side to side relative to the trailing portion of said lower shear blade; and means cooperable with the kinked lower shear blade and the upper shear blade to orient the upper blade relative to the lower blade to maintain only point to point contact between the intersecting cutting edges of the upper and lower cutting teeth of said shear blades during reciprocating of the upper shear blade and also to sufficiently spring load the upper blade to insure sufficient point contact pressure between the intersecting cutting edges of the cutting teeth of the upper and lower shear blades to prevent inadvertent separation of the upper and lower cutting teeth during normal operation thereof, said means including pivot means passing through the apertures in said upper and lower shear blades, said pivot means having upper abutment means adapted to contact the upper surface of the upper movable shear blade thereby permitting the upper blade at the point of pivotal interconnection to be spaced away from the lower blade only a limited amount, and bearing means disposed between the trailing portion of the upper shear blade and the trailing portion of the lower shear blade, said bearing means maintaining the facing surface of the trailing portions of the upper and lower blades in spaced apart relationship with respect to each other;

the plane defined by the lower trailing surface of the upper blade when in contact with the bearing means and the upper abutment means of said pivot means intersecting the upper surface of the second intermediate portion of said kinked lower shear blade; the parts being so arranged and constructed that when the rearward ends of the cutting surfaces are in point to point contact, the leading portion of the upper shear blade will be flexed upwardly out of said last mentioned plane a small amount, and when the forward end of the cutting surfaces are in point to point contact the leading portion of the upper shear blade will be flexed upwardly out of said last mentioned plane a greater amount.

* * * * *